US012576819B2

(12) United States Patent (10) Patent No.: US 12,576,819 B2
Jo (45) Date of Patent: Mar. 17, 2026

(54) ELECTRONIC PARKING BRAKE SYSTEM AND CONTROL METHOD THEREOF

(71) Applicant: HL MANDO CORPORATION, Pyeongtaek-si (KR)

(72) Inventor: Kisung Jo, Pyeongtaek-si (KR)

(73) Assignee: HL MANDO CORPORATION, Pyeongtaek Si (KR)

( * ) Notice: Subject to any disclaimer, the term of this patent is extended or adjusted under 35 U.S.C. 154(b) by 182 days.

(21) Appl. No.: 18/532,758

(22) Filed: Dec. 7, 2023

(65) Prior Publication Data

US 2025/0050848 A1 Feb. 13, 2025

(30) Foreign Application Priority Data

Aug. 7, 2023 (KR) ........................ 10-2023-0102608

(51) Int. Cl.
*B60T 8/172* (2006.01)
*B60T 8/171* (2006.01)
*B60T 8/58* (2006.01)

(52) U.S. Cl.
CPC .............. *B60T 8/172* (2013.01); *B60T 8/171* (2013.01); *B60T 8/58* (2013.01); *B60T 2210/10* (2013.01); *B60T 2210/20* (2013.01); *B60T 2210/32* (2013.01); *B60T 2220/00* (2013.01); *B60T 2250/04* (2013.01)

(58) Field of Classification Search
CPC . B60T 8/172; B60T 8/171; B60T 8/58; B60T 2210/10; B60T 2210/20; B60T 2210/32; B60T 2220/00; B60T 2250/04; B60T 2201/10
See application file for complete search history.

(56) References Cited

U.S. PATENT DOCUMENTS

2013/0162010 A1* 6/2013 Koyama ................. B60T 7/122
303/6.01

FOREIGN PATENT DOCUMENTS

KR 10-1248330 4/2013
KR 10-1653298 9/2016
KR 10-2023-0036574 3/2023

* cited by examiner

*Primary Examiner* — Jacob M Amick
(74) *Attorney, Agent, or Firm* — LEE, HONG, DEGERMAN, KANG & WAIMEY

(57) ABSTRACT

Disclosed is an electronic parking brake system including: an electronic parking brake configured to generate a braking force in a vehicle by a motor; and a controller configured to operate or release the electronic parking brake, wherein the controller is configured to collect, according to detection of a driver's intention to park, at least one of vehicle information, surrounding environment information, or parking mode setting information of the vehicle; set a target braking force for parking the vehicle based on the at least one of the vehicle information, the surrounding environment information, or the parking mode setting information, and control a parking operation of the vehicle to generate the target braking force by operating the electronic parking brake.

19 Claims, 10 Drawing Sheets

[FIG. 1]
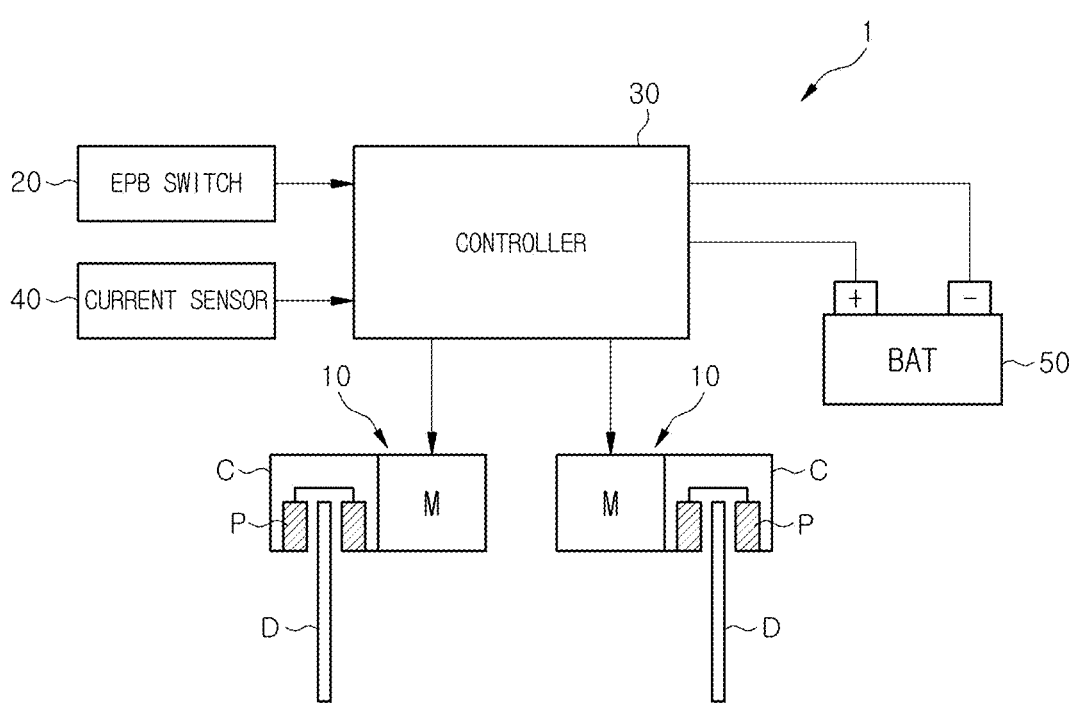

[FIG. 2]
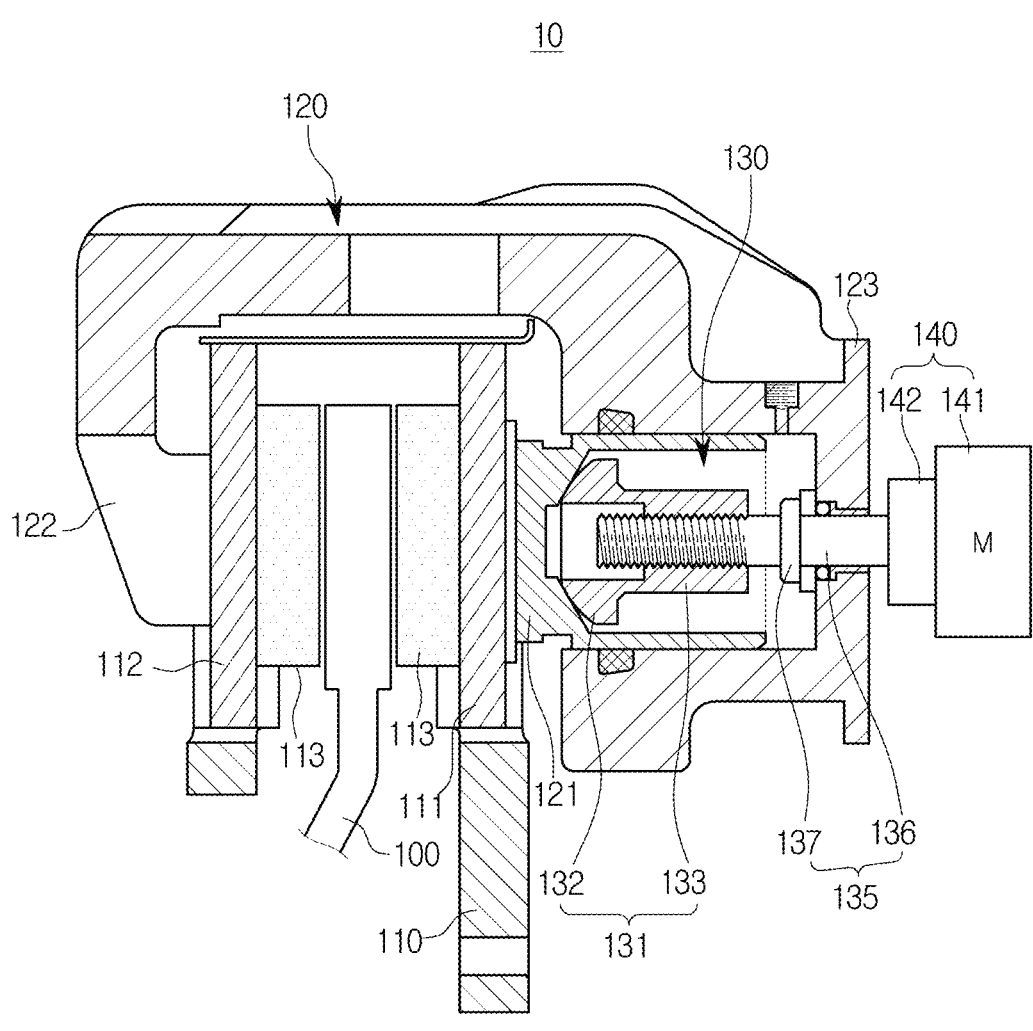

[FIG. 3]
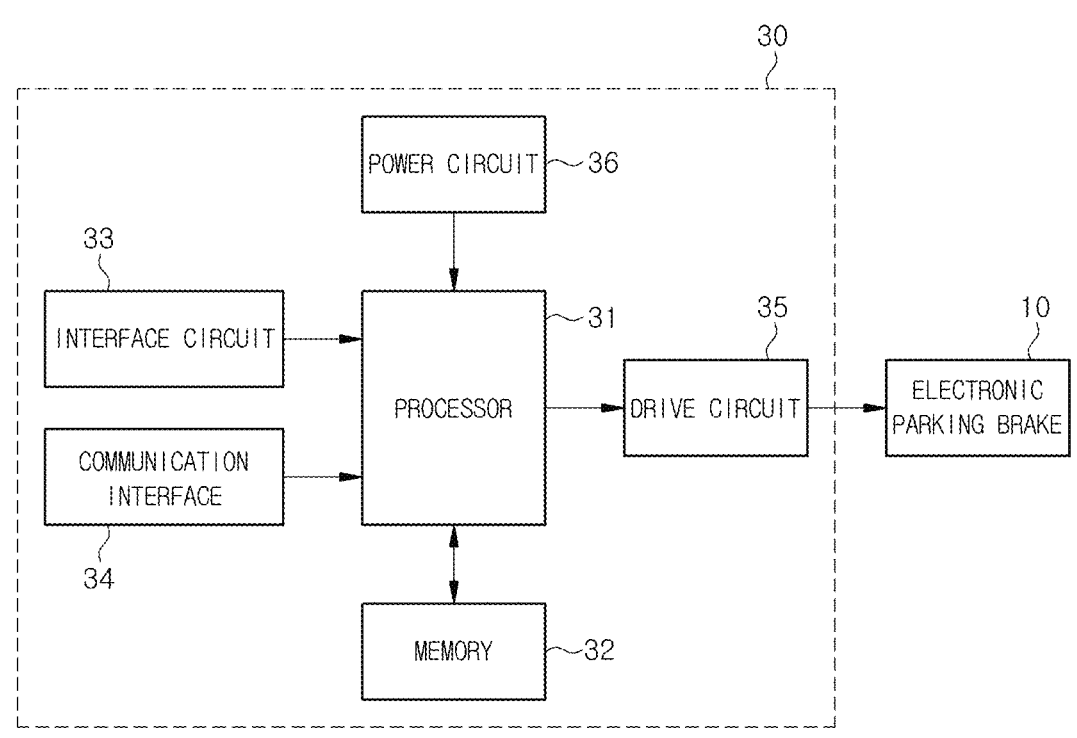

[FIG. 4]
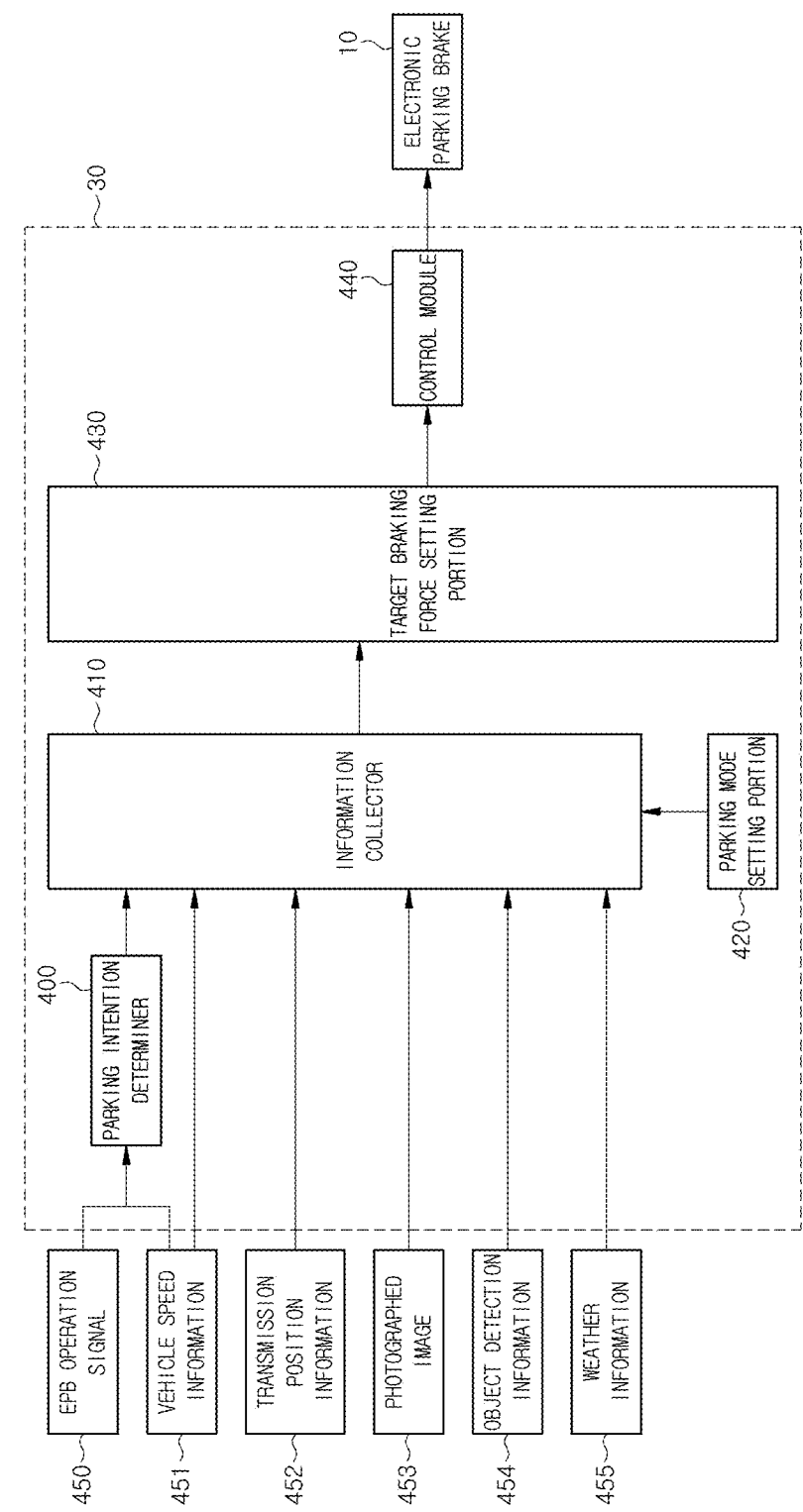

[FIG. 5A]
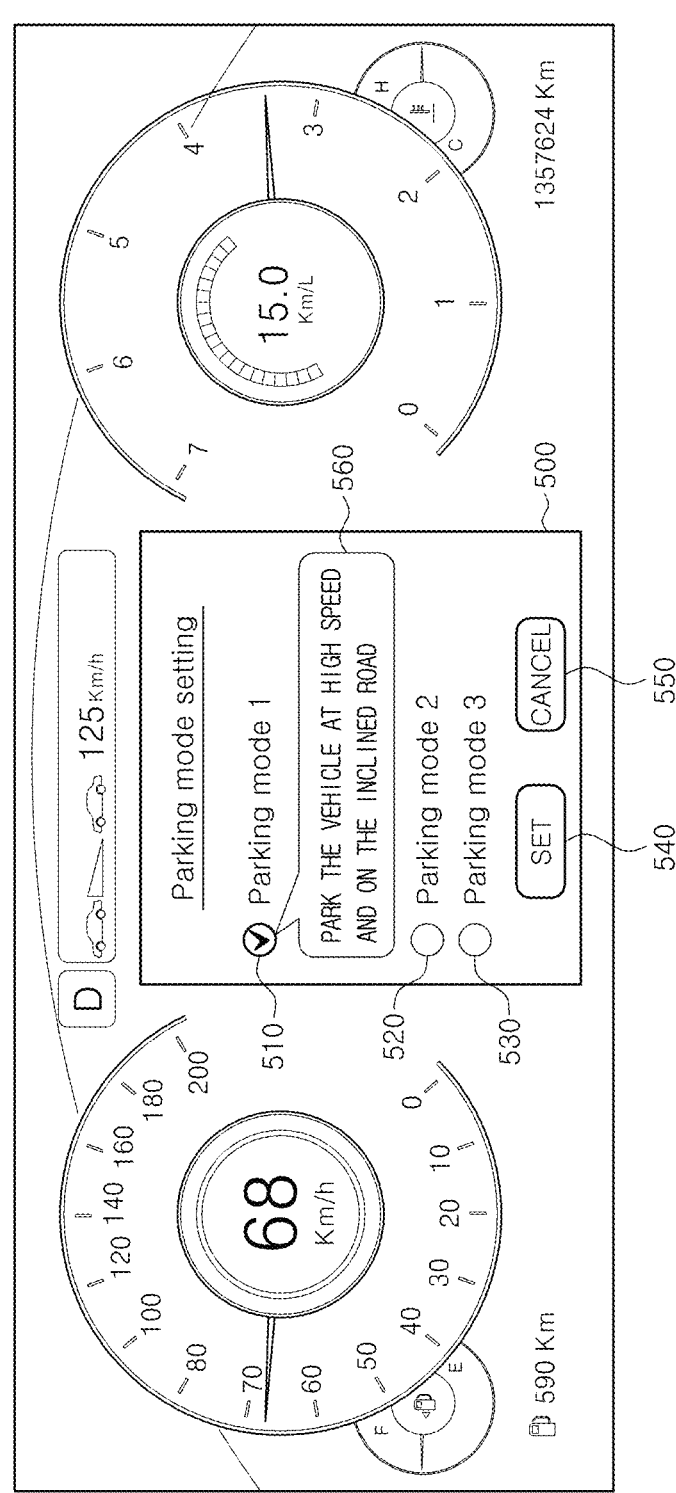

[FIG. 5B]
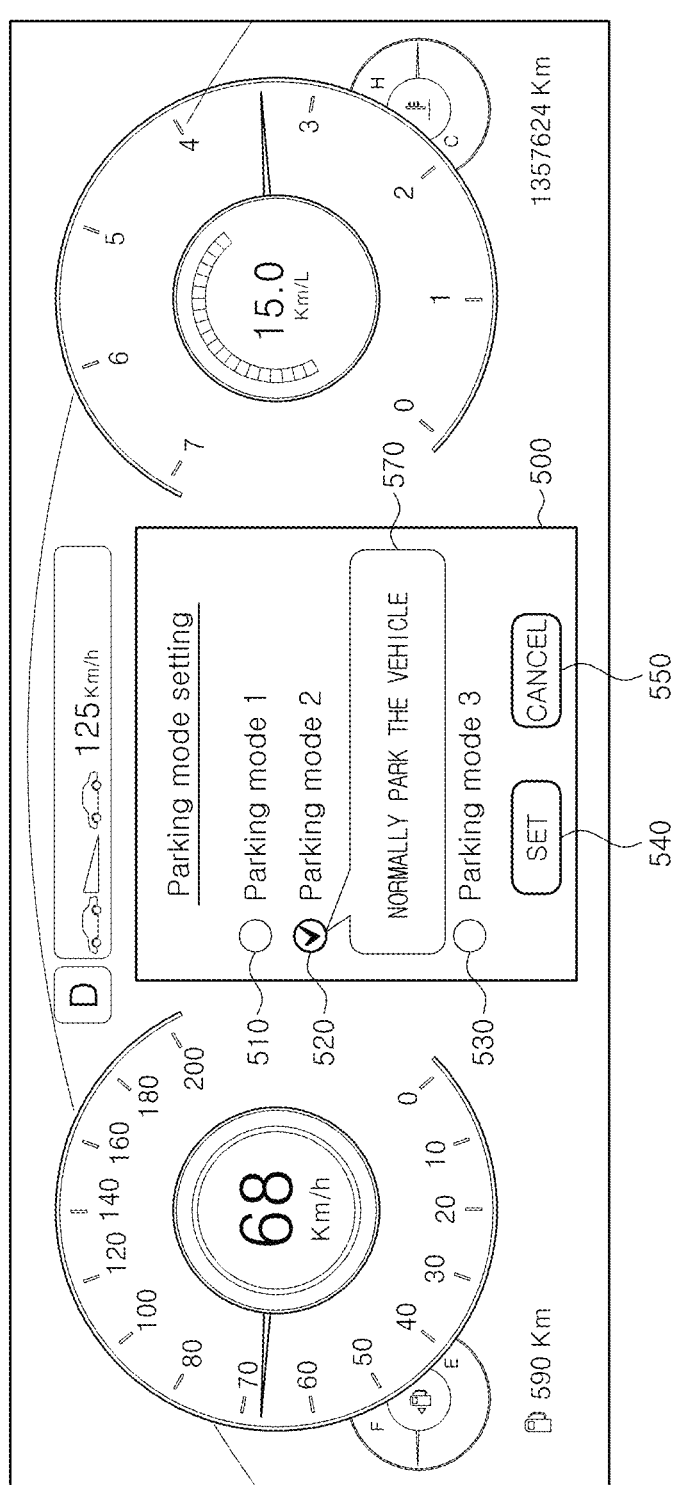

Figure 5C:
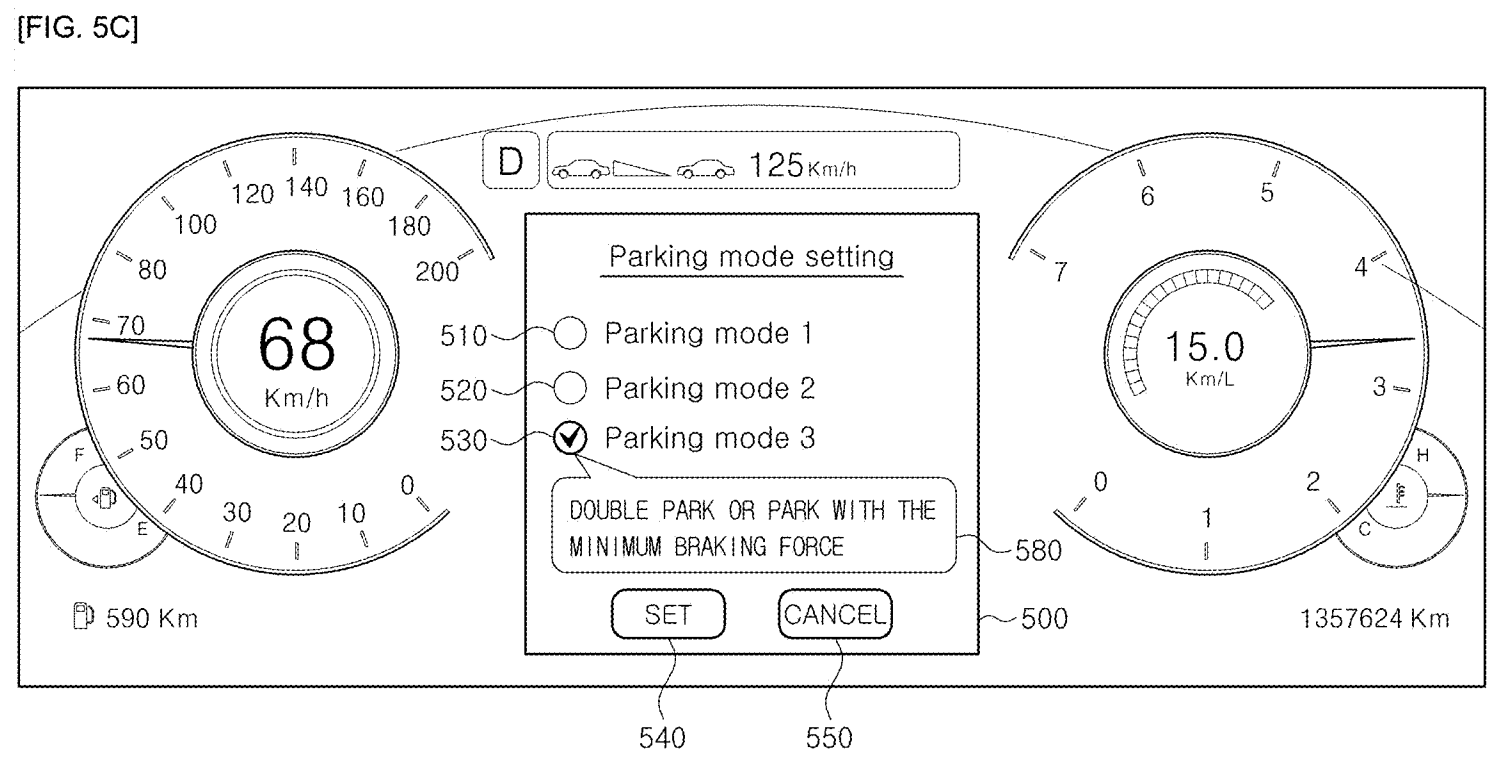

Parking mode setting

Parking mode 1 — 510

Parking mode 2 — 520

Parking mode 3 — 530

DOUBLE PARK OR PARK WITH THE MINIMUM BRAKING FORCE — 580

SET — 540

CANCEL — 550

| SETTING INFORMATION \ MODE TYPE | FIRST PARKING MODE | SECOND PARKING MODE | THIRD PARKING MODE |
|---|---|---|---|
| BRAKING FORCE (WITH RESPECT TO MAXIMUM BRAKING FORCE) | 70%~80% | 50%~60% | 30%~40% |
| SPEED | 10 KM/H OR LESS | 5 KM/H OR LESS | 5 KM/H OR LESS |
| SLOPE (WITH RESPECT TO VEHICLE) | 10 % TO 15 % | 7 % TO 10 % | 3 % TO 5 % |

[FIG. 7]
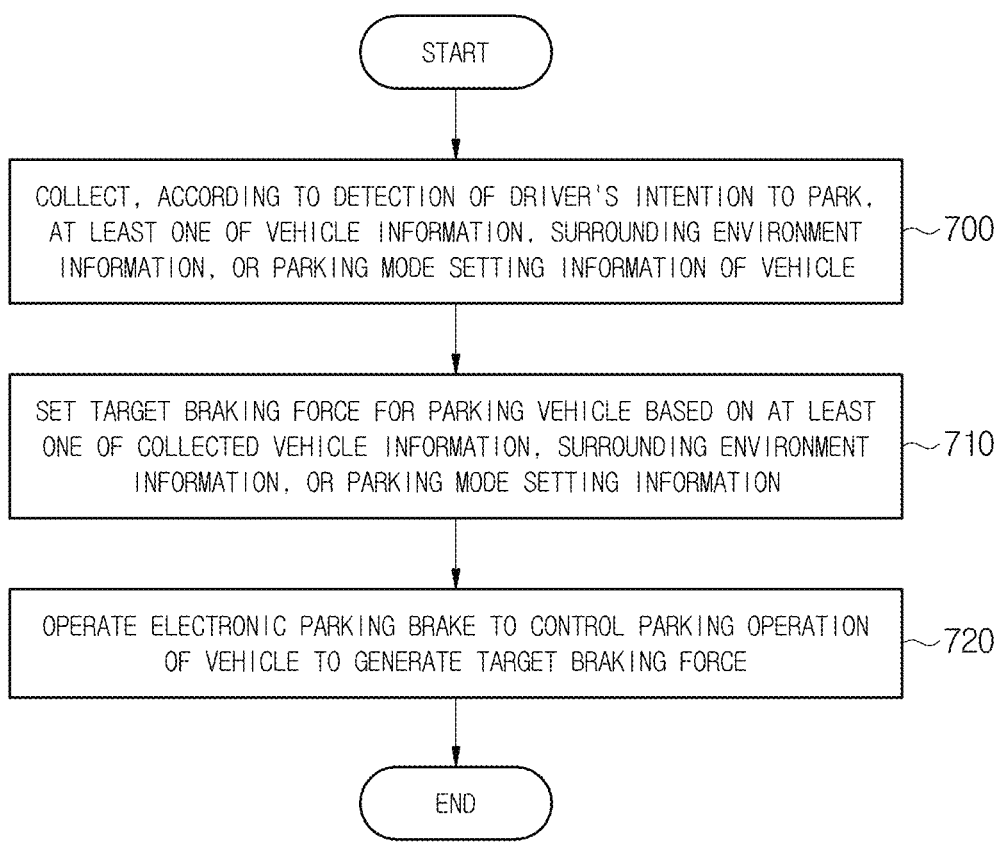

[FIG. 8]

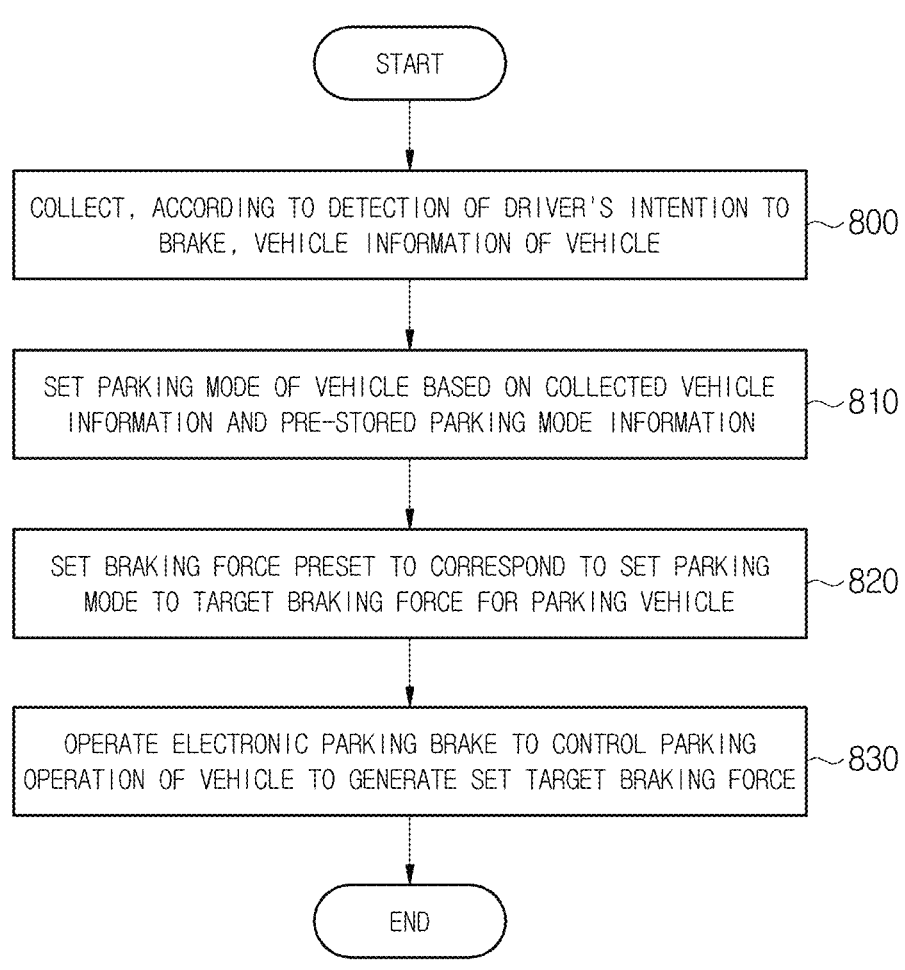

START

COLLECT, ACCORDING TO DETECTION OF DRIVER'S INTENTION TO BRAKE, VEHICLE INFORMATION OF VEHICLE ~800

SET PARKING MODE OF VEHICLE BASED ON COLLECTED VEHICLE INFORMATION AND PRE-STORED PARKING MODE INFORMATION ~810

SET BRAKING FORCE PRESET TO CORRESPOND TO SET PARKING MODE TO TARGET BRAKING FORCE FOR PARKING VEHICLE ~820

OPERATE ELECTRONIC PARKING BRAKE TO CONTROL PARKING OPERATION OF VEHICLE TO GENERATE SET TARGET BRAKING FORCE ~830

END

ELECTRONIC PARKING BRAKE SYSTEM AND CONTROL METHOD THEREOF

CROSS-REFERENCE TO RELATED APPLICATION

Pursuant to 35 U.S.C. § 119 (a), this application claims the benefit of earlier filing date and right of priority to Korean Patent Application No. 10-2023-0102608, filed on Aug. 7, 2023, the contents of which are hereby incorporated by reference herein in its entirety.

BACKGROUND

1. Field

The disclosure relates to an electronic parking brake system and a control method thereof.

2. Description of the Related Art

In general, an electronic parking brake (EPB) operates by a simple button operation without a user's operation of manually moving the parking brake. The electronic parking brake maintains the vehicle in a parked or stopped state by automatically controlling the braking force applied to the wheels to prevent the vehicle from rolling back when the vehicle stops or starts at a hill.

Electronic parking brakes are classified into a cable puller type or a caliper type, and a Motor on Caliper (MoC) as a motor-driven caliper type is installed in many models of vehicles. A MoC type electronic parking brake presses the brake disc with the brake pads through the MoC screw to generate a braking force of the brake with a friction force between the brake disc and the brake pads.

However, because existing electronic parking brakes operate depending on an EPB switch input by a driver without considering the speed of the vehicle, a road surface condition, a driving mode, and/or a parking situation, energy is consumed unnecessarily, resulting in a great increase of fuel consumption of the vehicle.

Accordingly, to prevent unnecessary energy consumption and minimize fuel consumption of the vehicle, an electronic parking brake system capable of generating a braking force by considering the speed of the vehicle, a road surface condition, a driving mode, a parking situation, etc. is needed.

SUMMARY

It is an aspect of the disclosure to provide an electronic parking brake system capable of generating a braking force by considering speed of a vehicle, a road surface condition, a driving mode, a parking situation, etc. to prevent unnecessary energy consumption and minimize fuel consumption of the vehicle, and a method for controlling the electronic parking brake system.

It is another aspect of the disclosure to provide an electronic parking brake system for allowing another driver to move a driver's own vehicle double-parked using an electronic parking brake, and a method for controlling the electronic parking brake system.

Additional aspects of the disclosure will be set forth in part in the description which follows and, in part, will be obvious from the description, or may be learned by practice of the disclosure.

In accordance with an aspect of the disclosure, an electronic parking brake system may include: an electronic parking brake configured to generate a braking force in a vehicle by a motor; and a controller configured to operate or release the electronic parking brake, wherein the controller may be configured to collect, according to detection of a driver's intention to park, at least one of vehicle information, surrounding environment information, or parking mode setting information of the vehicle; set a target braking force for parking the vehicle based on the at least one of the vehicle information, the surrounding environment information, or the parking mode setting information, and control a parking operation of the vehicle to generate the target braking force by operating the electronic parking brake.

The controller may be further configured to determine whether speed of the vehicle is lower than threshold speed preset to operate the electronic parking brake, and identify the driver's intention to park according to the speed of the vehicle being lower than the threshold speed.

The vehicle information may include vehicle speed information including at least one of speed, acceleration, or acceleration of gravity of the vehicle, and transmission position information indicating a position of a transmission of the vehicle.

The surrounding environment information may include a photographed image obtained by photographing a front view, a side view, or a rear view from the vehicle, object detection information representing an object detected in a front direction, a side direction, or a rear direction from the vehicle, or weather information provided from an external system.

The controller may be further configured to set, according to identification of the driver's intention to park, the target braking force based on the vehicle speed information.

The controller may be further configured to determine, according to identification of the driver's intention to park, whether the vehicle is forward driving, reverse driving, or neutral driving based on the transmission position information, and set the target braking force according to the forward driving, the reverse driving, or the neutral driving of the vehicle.

The controller may be further configured to identify, according to identification of the driver's intention to park, a road surface condition representing a degree of slipping of a road surface on which the vehicle is placed, based on the photographed image and the weather information, and set the target braking force based on the vehicle speed information and the road surface condition.

The controller may be further configured to recognize an image of a road surface around the vehicle from the photographed image, and identify the road surface condition based on the image of the road surface and the weather information.

The parking mode setting information may include information about a parking mode selected by the driver from among a first parking mode, a second parking mode, or a third parking mode.

The first parking mode may be an operation mode for parking the vehicle traveling at first vehicle speed preset at a terrain corresponding to a first road slope preset.

The second parking mode may be an operation mode for parking the vehicle traveling at second vehicle speed being lower than the first vehicle speed at a terrain corresponding to a second road slope being smaller than the first preset road slope.

The third parking mode may be an operation mode for parking the vehicle traveling at the second vehicle speed at a terrain corresponding to a third road slope being smaller than the first road slope and the second road slope.

The controller may be further configured to store, according to a selection of a parking mode from among the first parking mode, the second parking mode, or the third parking mode by the driver, information about the selected parking mode as the parking mode setting information.

The controller may be further configured to identify, according to identification of the driver's intention to park, a braking force corresponding to the selected parking mode by using pre-stored parking mode information, and set the identified braking force to the target braking force.

The parking mode information may include information about a first braking force preset to correspond to the first parking mode, a second braking force preset to correspond to the second parking mode, and a third braking force preset to correspond to the third parking mode.

In accordance with an aspect of the disclosure, an electronic parking brake system may include: an electronic parking brake configured to generate a braking force in a vehicle by a motor; and a controller configured to operate or release the electronic parking brake, wherein the controller may be configured to identify, according to detection of a driver's intention to park, a parking mode of the vehicle based on vehicle information and parking mode information of the vehicle, set a braking force preset to correspond to the identified parking mode to a target braking force for parking the vehicle, and control a parking operation of the vehicle to generate the target braking force by operating the electronic parking brake.

The vehicle information may include vehicle speed information including at least one of speed, acceleration, or acceleration of gravity of the vehicle.

The parking mode information may include information about: a first parking mode for parking the vehicle traveling at first vehicle speed preset at a terrain corresponding to a first road slope preset, and a first braking force preset to correspond to the first parking mode; a second parking mode for parking the vehicle traveling at second vehicle speed being lower than the first vehicle speed at a terrain corresponding to a second road slope being smaller than the first road slope, and a second braking force preset to correspond to the second parking mode; and a third parking mode for parking the vehicle traveling at the second vehicle speed at a terrain corresponding to a third road slope being smaller than the first road slope and the second road slope, and a third braking force preset to correspond to the third parking mode.

The controller may be further configured to identify speed of the vehicle and a road slope from the vehicle speed information, set a parking mode from among the first parking mode, the second parking mode, or the third parking mode based on the speed, the road slope, and the parking mode information, and set a braking force preset to correspond to the set parking mode to the target braking force.

The controller may be further configured to set, according to the set parking mode being the first parking mode, the first braking force to the target braking force.

The controller may be further configured to set, according to the set parking mode being the second parking mode, the second braking force to the target braking force.

The controller may be further configured to set, according to the set parking mode being the third parking mode, the third braking force to the target braking force.

In accordance with an aspect of the disclosure, a method for controlling an electronic parking brake system may include: collecting, according to detection of a driver's intention to park a vehicle, at least one of vehicle information, surrounding environment information, or parking mode setting information of the vehicle; setting a target braking force for parking the vehicle based on the at least one of the vehicle information, the surrounding environment information, or the parking mode setting information, and controlling a parking operation of the vehicle to generate the target braking force by operating an electronic parking brake by a motor.

In accordance with an aspect of the disclosure, a method for controlling an electronic parking brake system may include: setting, according to detection of a driver's intention to park a vehicle, a parking mode of the vehicle based on vehicle information and parking mode information of the vehicle; setting a braking force preset to correspond to the set parking mode to a target braking force for parking the vehicle; and controlling a parking operation of the vehicle to generate the target braking force by operating an electronic parking brake of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of an electronic parking brake system applied to a vehicle according to an embodiment;

FIG. 2 illustrates a configuration of an electronic parking brake applied to an electronic parking brake system according to an embodiment;

FIG. 3 illustrates a configuration of a controller included in an electronic parking brake system according to an embodiment;

FIG. 4 illustrates functional modules of a controller included in a driving assistance apparatus according to an embodiment;

FIGS. 5A, 5B, and 5C illustrate examples of a user interface for setting a parking mode according to an embodiment;

FIG. 6 illustrates an example of parking mode information according to an embodiment;

FIG. 7 illustrates an operation of an electronic parking brake system according to an embodiment; and FIG. 8 illustrates an operation of an electronic parking brake system according to various embodiments.

DETAILED DESCRIPTION

Like reference numerals refer to like components throughout the specification. This specification does not describe all the components of the embodiments, and duplicative contents between embodiments or general contents in the technical field of the present disclosure will be omitted. The terms 'portion,' 'module,' 'member,' and 'block' used in this specification may be embodied as software or hardware, and it is also possible for a plurality of 'portions,' 'modules,' 'members,' and 'blocks' to be embodied as one component, or one 'portion,' 'module,' 'member,' and 'block' to include a plurality of components according to embodiments.

Throughout the specification, when a portion is referred to as being "connected" to another portion, it includes not only a direct connection but also an indirect connection, and the indirect connection includes connecting through a wireless network.

Also, when it is described that a portion "includes" a component, it means that the portion may further include other components, not excluding the other components unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one component from another component, and the components are not limited by the above-mentioned terms.

The singular forms 'a,' 'an,' and 'the' include plural referents unless the context clearly dictates otherwise.

In respective operations, identification numerals are used for convenience of explanation, the identification numerals do not describe the order of the operations, and the operations may be performed differently from the order specified unless the context clearly states a particular order.

Hereinafter, an operation principle and embodiments of the disclosure will be described with reference to the accompanying drawings.

FIG. 1 illustrates a configuration of an electronic parking brake system applied to a vehicle according to an embodiment.

Referring to FIG. 1, an electronic parking brake system 1 may include an electronic parking brake (EPB) 10, an EPB switch 20, a controller 30, and a current sensor 40.

The electronic parking brake 10 may provide a clamping force for parking to a brake disc D that rotates together with wheels of a vehicle, for example, left and right rear wheels. In other words, the electronic parking brake 10 may generate a clamping force for parking for each rear wheel. The electronic parking brake 10 may be controlled by the controller 30 electrically connected thereto.

The electronic parking brake 10 may generate an appropriate clamping force by operating by an electric motor M. More specifically, the electronic parking brake 10 operating by the electric motor M may generate a clamping force by pressing the brake disc D with a brake pad P in a brake caliper C in the left and right rear wheels.

The EPB switch 20 may be a switch for receiving a driver's intention to operate the electronic parking brake 10, and may be provided around a driver seat of the vehicle.

The EPB switch 20 may be turned on or off by the driver.

When the EPB switch 20 is tuned on, the EPB switch 20 may transfer a signal corresponding to a parking command (clamping command) to the controller 30, and when the EPB switch 20 is turned off, the EPB switch 20 may transfer a signal corresponding to a parking release command (clamping release command) to the controller 30.

The controller 30 may clamp or release the electronic parking brake 10 in response to an operation signal from the EPB switch 20 or an operation signal generated by a program related to an operation of the electronic parking brake 10.

The controller 30 may determine whether a current clamping force reaches a target clamping force during parking to finish a parking control.

The controller 30 may receive power from a battery 50 and detect a supply voltage supplied from the battery 50.

The controller 30 may generate a clamping force by supplying power provided from the battery 50 to the electric motor M of the electronic parking brake 10 to drive the electric motor M. Also, when the controller 30 generates a clamping force by driving the electric motor M of the electronic parking brake 10 or releases the clamping force, the controller 30 may supply power to the electric motor M or stop supplying power to the electric motor M.

The controller 30 may communicate with various systems installed in the vehicle through a network bus. The network bus may be Ethernet, Media Oriented Systems Transport (MOST), Flexray, Controller Area Network (CAN), Local Interconnect Network (LIN), and the like.

The current sensor 40 may detect current flowing to the electric motor M of the electronic parking brake 10.

The current sensor 40 may detect motor current flowing to the electric motor M by using a shunt resistor or a hall sensor, although not limited thereto. However, various methods for detecting motor current, instead of the shunt resistor or the hall sensor, may be used.

FIG. 2 illustrates a configuration of an electronic parking brake applied to an electronic parking brake system according to an embodiment.

Referring to FIG. 2, the electronic parking brake 10 may include a carrier 110 in which a pair of pad plates 111 and 112 are installed in such a way as to move back and forth in order to press a brake disc 100 rotating together with a wheel of a vehicle, a caliper housing 120 provided with a cylinder 123 which is slidable with respect to the carrier 110 and in which a piston 121 is installed in such a way to move back and forth by braking hydraulic pressure, a power conversion unit 130 for pressing the piston 121, and a motor actuator 140 for transferring a rotational force to the power conversion unit 130 by using the electric motor M.

The pair of pad plates 111 and 112 may be divided into an inner pad plate 111 positioned to be in contact with the piston 121, and an outer pad plate 112 positioned to be in contact with a finger portion 122 of the caliper housing 120. The pair of pad plates 111 and 112 may be installed in the carrier 110 fixed to the vehicle to move back and forth toward both sides of the brake disc 100. A brake pad 113 may be attached to one side of each of the pad plates 111 and 112, the one side facing the brake disc 100.

The caliper housing 120 may be sliable with respect to the carrier 110. More specifically, the caliper housing 120 may include the cylinder 123 in which the power conversion unit 130 is installed at the rear portion and the piston 121 is installed in such a way as to move back and forth, and the finger portion 122 molded to be bent downward to operate the outer pad plate 112 at the front portion. The finger portion 122 and the cylinder 123 may be integrated into one body.

The piston 121 may have a cylindrical shape of which an inside is cup-shaped, and may be inserted in the cylinder 123 to be slidable inside the cylinder 123. The piston 121 may press the inner pad plate 111 toward the brake disc 100 by an axial force of the power conversion unit 130 that has received a rotational force from the motor actuator 140. Accordingly, while the axial force of the power conversion unit 130 is applied, the piston 121 may move toward the inner pad plate 111 to press the inner pad plate 111, and the caliper housing 120 may operate in an opposite direction of a movement direction of the piston 121 by a reaction force. Thus, the finger portion 122 may press the outer pad plate 112 toward the brake disc 100, thereby performing braking.

The power conversion unit 130 may function to press the piston 121 toward the inner pad plate 111 by receiving a rotational force from the motor actuator 140.

The power conversion unit 130 may include a nut member 131 positioned inside the piston 121 and being in contact with the piston 121, and a spindle member 135 screwed to the nut member 131.

The nut member 131 may be positioned inside the piston 121 in a state of being limited in rotation and may be screwed to the spindle member 135.

The nut member 131 may include a head portion 132 being in contact with the piston 121, and a coupling portion 133 extending from the head portion 132 and screwed to the spindle member 135, wherein a female screw thread is formed in an inner circumferential surface of the coupling portion 133.

The nut member 131 may press or release the piston 121 while moving in a forward direction or in a backward direction according to a rotation direction of the spindle member 135. The forward direction may be a movement direction in which the nut member 131 moves toward the piston 121. The backward direction may be a movement direction in which the nut member 131 moves away from the piston 121. Also, the forward direction may be a movement direction in which the piston 121 moves toward the brake pad 113, and the backward direction may be a movement direction in which the piston 121 moves away from the brake pad 113.

The spindle member 135 may include a shaft portion 136 penetrating the rear portion of the caliper housing 120 and rotating by receiving a rotational force from the motor actuator 140, and a flange portion 137 extending in a radial direction from the shaft portion 136. One side of the shaft portion 136 may penetrate a rear side of the cylinder 123 and be rotatable, and another side of the shaft portion 136 may be positioned inside the piston 121. The one side of the shaft portion 136 penetrating the cylinder 123 may be connected to an output side of a reducer 142 to receive a rotational force from the motor actuator 140.

The motor actuator 140 may include an electric motor 141 and the reducer 142.

The electric motor 141 may rotate the spindle member 135 to move the nut member 131 back and forth, thereby pressing or releasing the piston 121.

The reducer 142 may be provided between the output side of the electric motor 141 and the spindle member 135.

According to the above-described configuration, the electronic parking brake 10 may rotate the spindle member 135 in one direction by using the motor actuator 140 during parking to move the nut member 131 and thereby press the piston 121. The piston 121 pressed by the movement of the nut member 131 may press the inner pad plate 111 to press the brake pad 113 to the brake disc 100, thereby performing a clamping operation of generating a clamping force.

Also, the electronic parking brake 10 may rotate the spindle member 135 in an opposite direction by using the motor actuator 140 upon parking release to move the nut member 131 pressed to the piston 121 backward. The piston 121 may be released by the backward movement of the nut member 131. Because the piston 121 is released, the brake pad 113 may be spaced from the brake disc 100 and accordingly, a release operation of releasing the clamping force may be performed.

FIG. 3 illustrates a configuration of a controller included in an electronic parking brake system according to an embodiment.

Referring to FIG. 3, the controller 30 may include a processor 31, a memory 32, an interface circuit 33, a communication interface 34, a drive circuit 35, and a power circuit 36.

The processor 31 may control overall operations of the electronic parking brake system 1.

The processor 31 may rotate the electric motor 141 of the electronic parking brake 10 forward or backward through the drive circuit 35 upon parking or parking release.

The processor 31 may perform parking apply or parking release in response to an operation signal from the EPB switch 20 operated by a driver, or an operation signal generated by a program related to an operation of the electronic parking brake 10.

The processor 31 may perform a parking apply operation of rotating the electric motor 141 in one direction to move the nut member 131 forward and press the piston 121 and thereby pressing the brake pad 113 to the brake disc D to generate a clamping force.

The processor 31 may perform a parking release operation of rotating the electric motor 141 in the opposite direction to move the nut member 131 backward and release the piston and thereby releasing the brake pad 113 pressed to the brake disc D to release the clamping force.

The processor 31 may detect and recognize a voltage supplied to the electric motor (M) 141 of the electronic parking brake 10 by using the power circuit 36.

According to an embodiment, the processor 31 may collect, according to detection of a driver's intention to park, at least one among vehicle information, surrounding environment information, or parking mode setting information of the vehicle, set a target clamping force for parking the vehicle based on the at least one information among the vehicle information, the surrounding environment information, or the parking mode setting information of the vehicle, and operate the electronic parking brake 10 to control a parking operation of the vehicle such that the target clamping force is generated. Herein, the vehicle information may be vehicle speed information including at least one of speed, acceleration, or acceleration of gravity, and transmission position information indicating a position of a transmission of the vehicle. The surrounding environment information may include a photographed image obtained by photographing a front view, a side view, or a rear view from the vehicle, object detection information representing an object detected in a front, side, or rear direction from the vehicle, and weather information provided from an external system. The parking mode setting information may include information about a parking mode selected by the driver from among a plurality of preset parking modes.

Upon reception of an operation signal from the EPB switch 20 operated by the driver through the interface circuit 33 or an operation signal generated by a program related to an operation of the electronic parking brake 10, the processor 31 may identify the driver's intention to park.

The processor 31 may receive vehicle information and/or surrounding environment information of the vehicle from various systems inside the vehicle through the communication interface 34. For example, the various systems inside the vehicle may include sensors for detecting vehicle dynamics, front, side and/or rear sensors (a camera, a radar, a lidar, etc.) for detecting front, side, and/or rear views from the vehicle, an engine, an engine control module, a transmission, and a transmission control module, and may include a driving system for moving the vehicle, a brake system for braking the vehicle, a steering system for changing a driving direction of the vehicle, a display for providing various information and entertainment to the driver through images and sound, and an audio system for providing various information and entertainment to the driver through sound.

According to various embodiments, the various systems inside the vehicle may further include a wireless communication interface for wireless communication with an external system, and may also receive various information such as weather information from the external system.

According to an embodiment, the sensors may include a vehicle speed sensor for detecting longitudinal speed of the vehicle, an acceleration sensor for detecting longitudinal acceleration and lateral acceleration of the vehicle, and/or a gyro sensor for detecting a yaw rate, a roll rate, and a pitch rate of the vehicle, although not limited thereto. However, the sensors may further include an acceleration-of-gravity sensor (G sensor) for detecting an inclination of the vehicle.

According to some embodiments, the processor 31 may receive vehicle speed information including current speed, acceleration, angular speed, and/or acceleration of gravity of the vehicle from the sensors for detecting vehicle dynamics, determine whether the current speed of the vehicle is smaller than preset threshold speed based on the received vehicle speed information, and identify the driver's intention to park when the current speed is smaller than the preset threshold speed.

According to some embodiments, the processor 31 may receive transmission position information indicating a position (a driving position D, a reverse position R, or a neutral position N) of the transmission from the transmission control module.

According to some embodiments, the processor 31 may receive a photographed image obtained by photographing a front, rear and/or side view from the vehicle from a camera.

According to some embodiments, the processor 31 may receive object detection information about an object detected in the front, rear, and/or side direction from the vehicle from an object detection sensor.

According to some embodiments, the processor 31 may receive weather information from an external system such as a meteorological administration.

According to some embodiments, the processor 31 may provide a user interface through the display to enable the driver to set a parking mode. For example, the parking mode may include a first parking mode for performing a parking operation of the vehicle at high speed and on an inclined road, a second parking mode for performing a normal parking operation of the vehicle, and a third parking mode for performing a parking operation of the vehicle with a minimum braking force. According to an embodiment, the normal parking operation may be parking on a road with a low slope or on a flat road, although not limited thereto. According to a selection of any parking mode by the driver through the display, the processor 31 may store information about the parking mode selected by the driver as parking mode setting information in the memory 32.

According to various embodiments, the processor 31 may identify double parking of the vehicle, and according to double parking of the vehicle, the processor may set a target braking force for double parking. More specifically, the processor 31 may determine whether there are a plurality of other vehicles parked around the vehicle, and identify double parking of the vehicle according to locations of the plurality of other vehicles. For example, when front or rear sides of a plurality of other vehicles parked are detected at one side of the vehicle, the processor 31 may identify double parking of the vehicle.

According to various embodiments, when an object is detected in the front or rear direction from the vehicle double-parked, or when a pushing force is detected in the front or rear direction of the vehicle, the processor 31 may collect vehicle speed information, and determine whether a slope of a road on which the vehicle is placed corresponds to a slope requiring clamping of the electronic parking brake 10, based on the collected vehicle speed information. When the road slope corresponds to the slope requiring clamping of the electronic parking brake 10, the processor 31 may set a target braking force for fixing the vehicle and operate the electronic parking brake 10 to generate the target braking force. Accordingly, while the vehicle is double-parked using the electronic parking brake 10, another driver may easily move the vehicle double-parked, and, when the vehicle double-parked enters a terrain with a slope by a pushing force, the vehicle may be automatically fixed, thereby preventing a vehicle accident that may occur due to double-parking.

The memory 32 may store a program for processing or controlling the processor 31, and various data for operating the electronic parking brake 10. According to an embodiment, the memory 32 may store parking mode information that is used to set a target braking force according to a parking mode, wherein the parking mode information may include information about a first braking force preset to correspond to a first parking mode, a second braking force preset to correspond to a second parking mode, and/or a third braking force preset to correspond to a third parking mode. The parking mode information according to an embodiment will be described in detail with reference to FIG. 6, below.

The memory 32 may include a volatile memory, such as Static Random Access Memory (S-RAM) and Dynamic Random Access Memory (D-RAM), and a non-volatile memory, such as Read Only Memory (ROM) and Erasable Programmable Read Only Memory (EPROM).

The interface circuit 33 may receive a signal from various switches and sensors connected to the electronic parking brake system 1. The interface circuit 33 may receive an EPB signal and motor current from the EPB switch 20 and the current sensor 40.

The communication interface 34 may communicate with various systems inside the vehicle. The communication interface 34 may receive various information that is used to set a braking force by communicating with the various systems inside the vehicle.

The drive circuit 35 may rotate the electric motor (M) 141 forward or backward by supplying current to the electric motor (M) 141 of the electronic parking brake 10 and controlling a direction of current according to a control signal from the processor 31. According to the forward or backward rotation of the electric motor (M) 141, the brake pad 113 may move toward the brake disc 100 or move away from the brake disc 100 to generate or release a clamping force. Accordingly, the electronic parking brake 10 may be clamped or released.

The power circuit 36 may generate a preset operating voltage from power provided from the battery 50. The power circuit 36 may generate a driving voltage of the processor 31 or the drive circuit 35. The processor 31 or the drive circuit 35 may operate according to the driving voltage provided from the power circuit 33.

An operation of the electronic parking brake system 1 will be described in more detail, below.

FIG. 4 illustrates functional modules of a controller included in a driving assistance apparatus according to an embodiment.

Referring to FIG. 4, the controller 30 may include a plurality of functional modules. Each of the modules may be a hardware module (for example, application-specific integrated circuit (ASIC) or field-programmable gate array (FPGA)) included in the processor 31 or a software module (for example, application program or data) stored in the memory 32.

The controller 30 may include, as shown in FIG. 4, a parking intention determiner 400, an information collector 410, a parking mode setting portion 420, a target braking force setting portion 430, and a control module 440.

The parking intention determiner 400 of the controller 30 may identify a driver's intention to park according to reception of an EPB operation signal 450. For example, the parking intention determiner 400 may identify an intention to park according to turning-on of the EPB switch 20.

According to some embodiments, the parking intention determiner 400 may receive vehicle speed information from the vehicle speed sensor, and determine whether current speed of the vehicle is lower than or equal to preset threshold speed based on the received vehicle speed information. When the current speed of the vehicle is lower than or equal to the preset threshold speed, the parking intention determiner 400 may identify the driver's intention to park although no EPB operation signal is received. For example, the present threshold speed may be about 10 km/h, although not limited thereto. However, various threshold speed for identifying an intention to park may be set.

According to identification of the driver's intention to park, the information collector 410 may collect vehicle information, surrounding environment information and/or parking mode setting information that are used for a parking operation of the vehicle. The vehicle information may include vehicle speed information 451 including speed, acceleration, angular speed, and/or acceleration of gravity, etc., detected by the sensors for detecting vehicle dynamics, and transmission position information 452 representing a position of the transmission, detected by a transmission position sensor. The surrounding environment information may include a photographed image 453 obtained by photographing a front view, a side view and/or a rear view from the vehicle by a camera provided in a front, side and/or rear portion of the vehicle, object detection information 454 about an object detected by the object detection sensor, such as a radar and/or a lidar, provided in the front, side, and/or rear portion of the vehicle, and weather information 455 obtained from an external system. For example, the vehicle may further include a wireless communication interface for wireless communication with an external system, and receive the weather information 455 from an external system such as a meteorological administration through the wireless communication interface. The parking mode setting information may include information about a parking mode selected by the driver from among the first parking mode, the second parking mode, and the third parking mode, and the parking mode setting information may be provided from the parking mode setting portion 420.

According to an embodiment, the parking mode setting portion 420 of the controller 30 may provide a user interface for setting a parking mode according to an EPB operation by the driver, and obtain parking mode setting information including information about a parking mode selected by the driver through the user interface. This will be described in detail with reference to FIGS. 5A, 5B, and 5C.

FIGS. 5A, 5B, and 5C illustrate examples of a user interface for setting a parking mode according to an embodiment.

Referring to FIG. 5A, the display of the vehicle may display a vehicle control screen 500. The vehicle control screen 500 may provide a user interface for setting any one among the first parking mode, the second parking mode, and the third parking mode.

The display of the vehicle may include a touch screen, and receive, for example, a touch input by an electronic pen or a user's body part, a gesture input, a proximity input, a drag input, a swipe input, or a hovering input.

According to an embodiment, upon reception of an input for setting a parking mode of the vehicle by a driver's touch operation, the parking mode setting portion 420 may display the vehicle control screen 500 for setting an EPB parking mode, as shown in FIG. 5A.

The vehicle control screen 500 may include selection icons 510, 520, and 530 for selecting any one from among the first parking mode (Parking mode 1), the second parking mode (Parking mode 2), and the third parking mode (Parking mode 3), and set/cancel icons 540 and 550 for setting or cancelling a selected parking mode.

According to a selection of the selection icon 510 for selecting the first parking mode, the parking mode setting portion 420 may display a graphic object 560 representing guide information for the first parking mode on the vehicle control screen 500, as shown in FIG. 5A. For example, the graphic object 560 may be a sentence 'parking the vehicle at high speed and on the inclined road', although not limited thereto.

In various embodiments, according to a selection of the selection icon 520 for selecting the second parking mode, the parking mode setting portion 420 may display a graphic object 570 representing guide information for the second parking mode on the vehicle control screen 500, as shown in FIG. 5B. For example, the graphic object 570 may be a sentence 'normally parking the vehicle', although not limited thereto.

In various embodiments, according to a selection of the selection icon 530 for selecting the third parking mode, the parking mode setting portion 420 may display a graphic object 580 representing guide information for the third parking mode on the vehicle control screen 500, as shown in FIG. 5C. For example, the graphic object 580 may be a sentence 'double parking or parking with the minimum braking force', although not limited thereto.

When any one of the first, second, and third parking modes is selected and the set icon 540 is selected, the parking mode setting portion 420 may set a parking mode selected from among the first, second, and third parking modes to a parking mode that operates in response to the driver's intention to park. The parking mode setting portion 420 may obtain parking mode setting information including information about the parking mode selected by the driver from among the first, second, and third parking modes, and store the parking mode setting information.

Referring again to FIG. 4, according to an embodiment, the target braking force setting portion 430 of the controller 30 may set a target braking force based on the vehicle information and surrounding environment information collected by the information collector 410.

According to an embodiment, the target braking force setting portion 430 may set a target braking force for performing a parking operation of the vehicle based on vehicle speed information 451. In other words, the target braking force setting portion 430 may determine braking deceleration for braking the vehicle from the vehicle speed information 451, and set a target braking force according to the determined braking acceleration. More specifically, the target braking force setting portion 430 may calculate braking deceleration from the vehicle speed information 451, and calculate a friction force based on the braking deceleration and a weight of the vehicle. Successively, the target braking force setting portion 430 may set a target braking force based on the calculated friction force and the weight of the vehicle. Because a braking force is generally influenced by several factors, such as vehicle weight, vehicle mass, engine power, tire structure, and road surface conditions, the target braking force may be a variable value, not a fixed value.

According to an embodiment, the target braking force setting portion 430 may identify a road surface condition of the vehicle based on a photographed image 453 and weather information 455 obtained from an external system, identify braking deceleration according to the road surface condition and vehicle speed information, and then set a target braking force according to the identified braking deceleration.

More specifically, the target braking force setting portion 430 may recognize an image of a road surface around the vehicle from the photographed image 453, and identify a road surface condition representing a degree of slipping of the road surface by considering the recognized road surface image and the weather information 455. The target braking force setting portion 430 may calculate a friction coefficient according to the identified road surface condition. For example, the target braking force setting portion 430 may calculate a friction coefficient by considering a degree of slipping of the road surface depending on clear weather, rainy weather, snowy weather, etc. The target braking force setting portion 430 may calculate braking deceleration based on the calculated friction coefficient and acceleration of gravity, calculate a frictional force based on the mass of the vehicle and the braking deceleration, and then set a target braking force based on the calculated friction force and the weight of the vehicle.

According to an embodiment, the target braking force setting portion 430 may identify forward driving, backward driving, or neural driving of the vehicle based on transmission position information 452, and set a target braking force based on vehicle speed information and driving mode information representing the identified forward driving, backward driving or neural driving.

More specifically, the target braking force setting portion 430 may identify braking deceleration from the vehicle speed information according to forward driving or backward driving of the vehicle, and set a target braking force according to the identified braking deceleration. According to another embodiment, upon neutral driving of the vehicle, the target braking force setting portion 430 may identify braking deceleration according to current speed of the vehicle and a road slope, and set a target braking force according to the identified braking deceleration.

According to an embodiment, the target braking force setting portion 430 may set a target braking force based on parking mode setting information collected by the information collector 410.

More specifically, the target braking force setting portion 430 may use pre-stored parking mode information to set a target braking force based on parking mode setting information. The parking mode information will be described with reference to FIG. 6, below.

FIG. 6 illustrates an example of parking mode information according to an embodiment.

Referring to FIG. 6, parking mode information 600 may include information about the first, second, and third parking modes and preset braking forces corresponding to the respective parking modes. For example, the first, second, and third parking modes may be classified based on vehicle reference slopes (hereinafter, referred to as road slopes) and speed (hereinafter, referred to as vehicle speed).

More specifically, the parking mode information 600 may include information about a first braking force preset to correspond to the first parking mode for parking the vehicle traveling at first vehicle speed corresponding to 'high speed' at a first road slope corresponding to 'inclined road', a second braking force preset to correspond to the second parking mode for parking the vehicle traveling at second vehicle speed being lower than the first vehicle speed at a second road slope being smaller than the first road slope, and a third braking force preset to correspond to the third parking mode for parking the vehicle traveling at the second vehicle speed at a third road slope being smaller than the first road slope and the second road slope.

For example, the first vehicle speed may include speed of about 10 km/h or less, the first road slope may include a slope of about 10% to about 15%, and the first braking force may include a braking force of about 70% to about 80% of a maximum braking force. The second vehicle speed may include speed of about 5 km/h or less, the second road slope may include a slope of about 7% to about 10%, and the second braking force may include a braking force of about 50% to about 60% of the maximum braking force. The third road slope may include a slope of about 3% to 5%, and the third braking force may include a braking force of about 30% to about 40% of the maximum braking force.

More specifically, the target braking force setting portion 430 may identify a parking mode selected by the driver from the parking mode setting information. The target braking force setting portion 430 may identify a braking force corresponding to the selected parking mode by using the parking mode information 500, and set the identified braking force to a target braking force. For example, the selected parking mode may be the 'first parking mode'. In this case, the target braking force setting portion 430 may set a braking force of about 70% to about 80% of the maximum braking force, corresponding to the first parking mode, to a target braking force. The selected parking mode may be the 'second parking mode'. In this case, the target braking force setting portion 430 may set a braking force of about 50% to about 60% of the maximum braking force, corresponding to the second parking mode, to a target braking force. The selected parking mode may be the 'third parking mode'. In this case, the target braking force setting portion 430 may set a braking force of about 30% to about 40% of the maximum braking force, corresponding to the third parking mode, to a target braking force.

According to some embodiments, the target braking force setting portion 430 may set a parking mode of the vehicle based on at least a part of vehicle information and surrounding environment information, and set a target braking force corresponding to the set parking mode. The parking mode may include the first parking mode for parking the vehicle traveling at the first vehicle speed preset at a terrain corresponding to the first road slope preset, the second parking mode for parking the vehicle traveling at the second vehicle speed being lower than the first vehicle speed at a terrain corresponding to the second road slope being smaller than the first road slope, and the third parking mode for parking the vehicle traveling at the second vehicle speed at a terrain corresponding to the third road slope being smaller than the first road slope and the second road slope.

More specifically, the target braking force setting portion 430 may identify a road slope by using the vehicle speed information 451, and set a parking mode corresponding to vehicle speed and the identified road slope by using the parking mode information 600. For example, according to vehicle speed '10 km/h' and a road slope '15%', the target braking force setting portion 430 may set the 'first parking mode' corresponding to the vehicle speed '10 km/h' and the road slope '15%' to a parking mode corresponding to vehicle speed and a road slope.

Successively, the target braking force setting portion 430 may set a target braking force corresponding to the parking mode. For example, the target braking force setting portion 430 may set a braking force of about 70% to about 80% of the maximum braking force, corresponding to the first parking mode, to a target braking force.

According to an embodiment, the first parking mode, which is an operation mode for safely parking the vehicle even at high speed and at an inclined terrain, may have high fuel consumption compared to the second parking mode and the third parking mode. The second parking mode, which is an operation mode for safely parking the vehicle at a normal parking condition (for example, parking at a flat terrain) of the vehicle, may have lower fuel consumption than the first parking mode. The third parking mode, which is an operation mode for parking the vehicle with the minimum braking force, may have lowest fuel consumption compared to the first parking mode and the second parking mode. Particularly, the third parking mode may be useful upon double parking because of using the minimum braking force.

According to various embodiments, the target braking force setting portion 430 may identify double parking of the vehicle, and according to double parking of the vehicle, the target braking force setting portion 430 may set a target braking force for double parking. More specifically, the target braking force setting portion 430 may determine whether there are a plurality of other vehicles parked around the vehicle, based on the photographed image 453 and the object sensing information 454, and identify double parking of the vehicle based on locations of the plurality of other vehicles. For example, when front or rear portions of a plurality of other vehicles parked are detected at one side of the vehicle, the target braking force setting portion 430 may identify double braking of the vehicle. The target braking force setting portion 430 may set a target braking force based on braking force information preset for double parking. For example, the braking force information preset for double parking may include a braking force preset to correspond to the third parking mode for parking the vehicle with the minimum braking force, although not limited thereto. According to various embodiments, the target braking force setting portion 430 may identify braking deceleration based on vehicle speed and a road slope, and set a target braking force according to a weight of the vehicle and the identified braking deceleration.

According to various embodiments, when an object is detected in the front or rear direction from the vehicle double-parked, or when a pushing force is detected in the front or rear direction of the vehicle, the target braking force setting portion 430 may determine whether a slope of a road on which the vehicle is placed corresponds to a slope requiring clamping of the electronic parking brake 10 based on vehicle speed information. When the road slope corresponds to the slope requiring clamping of the electronic parking brake 10, the target braking force setting portion 430 may set a target braking force for fixing the vehicle.

According to an embodiment, the control module 440 of the controller 30 may control a parking operation of the vehicle by operating the electronic parking brake 10 to generate the target braking force. More specifically, the control module 440 may drive the electric motor (M) 141 of the electronic parking brake 10 to generate the target braking force set for the parking operation of the vehicle. When the target braking force is generated, the control module 440 may complete the parking operation of the vehicle by stopping the electric motor (M) 141. In other words, the control module 440 may rotate the electric motor (M) 141 in one direction, and then, when motor current detected through the current sensor 40 reaches target current corresponding to EPB clamping, the control module 440 may determine completion of EPB clamping and complete EPB clamping.

According to various embodiments, upon double parking of the vehicle, the control module 440 may operate the electronic parking brake 10 to generate a target braking force set for double parking, thereby controlling double parking of the vehicle. According to completion of double parking, the control module 440 may transfer a signal indicating completion of double parking to the transmission control module. The transmission control module which has received the signal may locate the transmission to the neutral position N.

According to various embodiments, when the target braking force for fixing the vehicle is set after an object is detected in the front or rear direction from the vehicle double-parked or after a pushing force is detected in the front or rear direction of the vehicle, the control module 440 may operate the electronic parking brake 10 to generate the target braking force for fixing the vehicle, thereby fixing the vehicle. Accordingly, upon double parking using the electronic parking brake 10, the vehicle may be automatically fixed even when the vehicle enters a terrain with a slope by a pushing force from another driver, thereby preventing a vehicle accident that may occur due to double-parking.

FIG. 7 illustrates an operation of an electronic parking brake system according to an embodiment.

Referring to FIG. 7, the controller 30 may collect, according to detection of a driver's intention to park, at least one of vehicle information, surrounding environment information, or parking mode setting information of the vehicle (700). More specifically, when an EPB control signal 450 is received from the EPB switch 20 or when current speed of the vehicle detected from the vehicle speed sensor is preset threshold speed or less, the controller 30 may identify the driver's intention to brake.

According to identification of the driver's intention to brake, the controller 30 may collect vehicle information including vehicle speed information 451 and transmission position information 452, surrounding environment information including a photographed image 453, object detection information 454, and weather information 455, and parking mode setting information including information about a parking mode selected by the driver.

According to an embodiment, the controller 30 may set a target braking force for parking the vehicle based on at least one of the collected vehicle information, surrounding environment information, or parking mode setting information (710).

More specifically, the controller 30 may set the target braking force based on vehicle speed obtained from the vehicle speed information 451.

According to an embodiment, the controller 30 may determine whether a driving mode of the vehicle is forward driving, backward driving, or neutral driving, based on a transmission position of forward, backward, or neutral, obtained from the transmission position information 452, and set a target braking force based on the driving mode.

According to some embodiments, the controller 30 may identify a road condition representing a degree of slipping of a road surface on which the vehicle is placed, based on the photographed image 453 and the weather information 455, and set a target braking force based on the vehicle speed information and the determined road condition.

According to some embodiments, the controller 30 may recognize a parking mode selected by a driver based on the parking mode setting information, identify a braking force corresponding to the recognized parking mode by using pre-stored parking mode information 600, and set the identified braking force to a target braking force.

According to an embodiment, the controller 30 may operate the electronic parking brake 10 to control a parking operation of the vehicle to generate the target braking force (720). More specifically, the controller 30 may rotate the electric motor (M) 141 in one direction, and then, when motor current detected through the current sensor 40 reaches target current corresponding to EPB clamping, the controller 30 may determine completion of EPB clamping to complete an EPB clamping operation, thereby completing the parking operation of the vehicle.

FIG. 8 illustrates an operation of an electronic parking brake system according to various embodiments.

Referring to FIG. 8, the controller 30 may collect, according to detection of a driver's intention to brake, vehicle information of the vehicle (800). More specifically, when an EPB operation signal 450 is received from the EPB switch 20 or when current speed of the vehicle detected by the vehicle speed sensor is preset threshold speed or less, the controller 30 may identify the driver's intension to brake.

According to an embodiment, the controller 30 may set a parking mode of the vehicle based on the collected vehicle information and pre-stored parking mode information 600 (810). Herein, the vehicle information may include vehicle speed information 451 including at least one of speed, acceleration, or acceleration of gravity of the vehicle.

More specifically, the controller 30 may identify speed of the vehicle and a road slope from the vehicle speed information 451, and identify any one of the first, second, and third parking modes based on the identified speed, the identified road slope, and the parking mode information 600. For example, when the identified speed of the vehicle is '4 km/h' and the identified road slope is '8%', the controller 30 may set the 'second parking mode' to a parking mode of the vehicle by using the parking mode information 600, as shown in FIG. 6.

According to an embodiment, the controller 30 may set a braking force preset to correspond to the parking mode to a target braking force (820). For example, when the set parking mode is the 'second parking mode', the controller 30 may set a second braking force (a braking force of about 50% to about 60% of the maximum braking force) corresponding to the second parking mode to a target braking force by using the parking mode information 600, as shown in FIG. 6.

According to an embodiment, the controller 30 may operate the electronic parking brake 10 to control a parking operation of the vehicle to generate the target braking force (830). More specifically, the controller 30 may rotate the electric motor (M) 141 in one direction, and then, when motor current detected through the current sensor 40 reaches target current corresponding to EPB clamping, the controller 30 may determine completion of EPB clamping to complete EPB clamping, thereby completing the parking operation of the vehicle.

As such, the electronic parking brake system according to the disclosure may generate a braking force by considering speed of the vehicle, a road condition, a driving mode, a parking situation, etc., thereby preventing unnecessary energy consumption for parking of the vehicle and minimizing fuel consumption of the vehicle.

Also, the electronic parking brake system according to the disclosure may allow another driver to move a driver's own vehicle double-parked using the electronic parking brake, and generate a braking force for fixing the vehicle when the vehicle enters an inclined road while moving, thereby preventing an accident that may occur due to double-parking.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, a flash memory, an optical data storage device, etc.

The machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes in all aspects.

What is claimed is:

1. An electronic parking brake system comprising:

an electronic parking brake configured to generate a braking force in a vehicle by a motor; and a controller configured to operate or release the electronic parking brake, wherein the controller is configured to collect, according to detection of a driver's intention to park, at least one of vehicle information, surrounding environment information, or parking mode setting information of the vehicle;

set a target braking force for parking the vehicle based on the at least one of the vehicle information, the surrounding environment information, or the parking mode setting information, and control a parking operation of the vehicle to generate the target braking force by operating the electronic parking brake, wherein the vehicle information includes vehicle speed information including:

at least one of speed, acceleration, or acceleration of gravity of the vehicle, and transmission position information indicating a position of a transmission of the vehicle.

2. The electronic parking brake system of claim 1, wherein the controller is further configured to determine whether speed of the vehicle is lower than a threshold speed preset to operate the electronic parking brake, and identify the driver's intention to park according to the speed of the vehicle being lower than the threshold speed.

3. The electronic parking brake system of claim 2, wherein
the surrounding environment information includes a photographed image obtained by photographing a front view, a side view, or a rear view from the vehicle, object detection information representing an object detected in a front direction, a side direction, or a rear direction from the vehicle, or weather information provided from an external system.

4. The electronic parking brake system of claim 3, wherein the controller is further configured to set, according to identification of the driver's intention to park, the target braking force based on the vehicle speed information.

5. The electronic parking brake system of claim 3, wherein the controller is further configured to
determine, according to identification of the driver's intention to park, whether a driving mode of the vehicle is forward driving, reverse driving, or neutral driving based on the transmission position information, and
set the target braking force according to the forward driving, the reverse driving, or the neutral driving of the vehicle.

6. The electronic parking brake system of claim 3, wherein the controller is further configured to
identify, according to identification of the driver's intention to park, a road surface condition representing a degree of slipping of a road surface on which the vehicle is placed, based on the photographed image and the weather information, and
set the target braking force based on the vehicle speed information and the road surface condition.

7. The electronic parking brake system of claim 6, wherein the controller is further configured to
recognize an image of a road surface around the vehicle from the photographed image, and
identify the road surface condition based on the image of the road surface and the weather information.

8. The electronic parking brake system of claim 3, wherein
the parking mode setting information includes information about a parking mode selected by the driver from among a first parking mode, a second parking mode, or a third parking mode,
the first parking mode is an operation mode for parking the vehicle traveling at first vehicle speed preset at a terrain corresponding to a first road slope preset,
the second parking mode is an operation mode for parking the vehicle traveling at second vehicle speed being lower than the first vehicle speed at a terrain corresponding to a second road slope being smaller than the first preset road slope, and
the third parking mode is an operation mode for parking the vehicle traveling at the second vehicle speed at a terrain corresponding to a third road slope being smaller than the first road slope and the second road slope.

9. The electronic parking brake system of claim 8, wherein the controller is further configured to store, according to a selection of a parking mode from among the first parking mode, the second parking mode, or the third parking mode by the driver, information about the selected parking mode as the parking mode setting information.

10. The electronic parking brake system of claim 8, wherein the controller is further configured to identify, according to identification of the driver's intention to park, a braking force corresponding to the selected parking mode by using pre-stored parking mode information, and
set the identified braking force to the target braking force.

11. The electronic parking brake system of claim 10, wherein the parking mode information includes information about a first braking force preset to correspond to the first parking mode, a second braking force preset to correspond to the second parking mode, and a third braking force preset to correspond to the third parking mode.

12. An electronic parking brake system comprising:
an electronic parking brake configured to generate a braking force in a vehicle by a motor; and
a controller configured to operate or release the electronic parking brake,
wherein the controller is configured to identify, according to detection of a driver's intention to park, a parking mode of the vehicle based on vehicle information and parking mode information of the vehicle,
set a braking force preset to correspond to the identified parking mode to a target braking force for parking the vehicle, and
control a parking operation of the vehicle to generate the target braking force by operating the electronic parking brake.

13. The electronic parking brake system of claim 12, wherein the vehicle information includes vehicle speed information including at least one of speed, acceleration, or acceleration of gravity of the vehicle.

14. The electronic parking brake system of claim 13, wherein the parking mode information includes information about:
a first parking mode for parking the vehicle traveling at first vehicle speed preset at a terrain corresponding to a first road slope preset, and a first braking force preset to correspond to the first parking mode;
a second parking mode for parking the vehicle traveling at second vehicle speed being lower than the first vehicle speed at a terrain corresponding to a second road slope being smaller than the first road slope, and a second braking force preset to correspond to the second parking mode; and
a third parking mode for parking the vehicle traveling at the second vehicle speed at a terrain corresponding to a third road slope being smaller than the first road slope and the second road slope, and a third braking force preset to correspond to the third parking mode.

15. The electronic parking brake system of claim 14, wherein the controller is further configured to
identify speed of the vehicle and a road slope from the vehicle speed information,
set a parking mode from among the first parking mode, the second parking mode, or the third parking mode based on the speed, the road slope, and the parking mode information, and
set a braking force preset to correspond to the set parking mode to the target braking force.

16. The electronic parking brake system of claim 15, wherein the controller is further configured to set, according to the set parking mode being the first parking mode, the first braking force to the target braking force.

17. The electronic parking brake system of claim 15, wherein the controller is further configured to set, according to the set parking mode being the second parking mode, the second braking force to the target braking force.

18. The electronic parking brake system of claim 15, wherein the controller is further configured to set, according to the set parking mode being the third parking mode, the third braking force to the target braking force.

19. A method for controlling an electronic parking brake system, comprising:

collecting, according to detection of a driver's intention to park a vehicle, at least one of vehicle information, surrounding environment information, or parking mode setting information of the vehicle;

setting a target braking force for parking the vehicle based on the at least one of the vehicle information, the surrounding environment information, or the parking mode setting information, and controlling a parking operation of the vehicle to generate the target braking force by operating an electronic parking brake by a motor, wherein the vehicle information includes vehicle speed information including:

at least one of speed, acceleration, or acceleration of gravity of the vehicle, and transmission position information indicating a position of a transmission of the vehicle.

\* \* \* \* \*